Nov. 12, 1968     K. A. McHENRY     3,410,030
SAFETY OVERSPEED CONTROL MECHANISM FOR ROTARY TOOLS
Filed Jan. 11, 1966     3 Sheets-Sheet 1
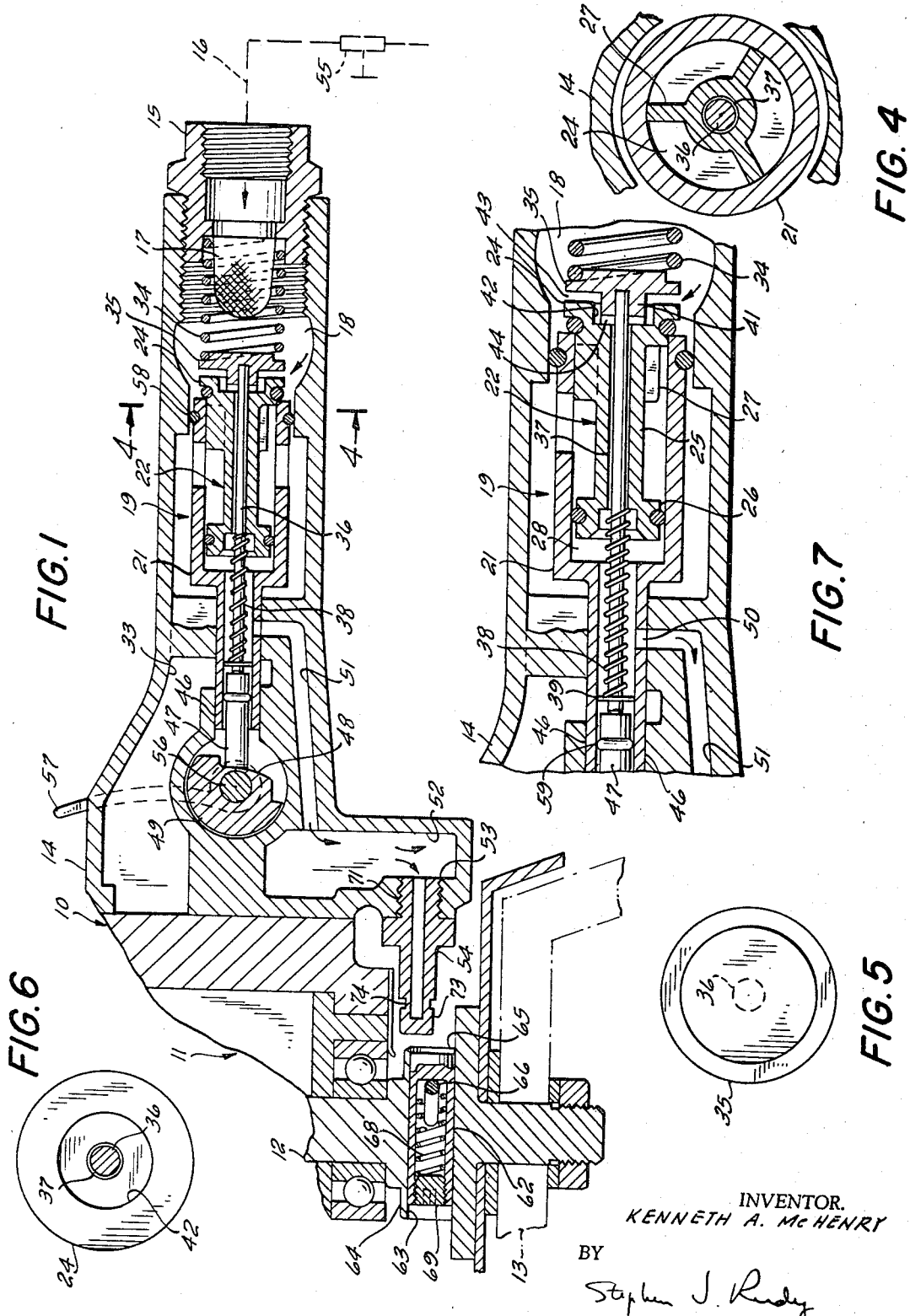
INVENTOR.
KENNETH A. McHENRY
BY
Stephen J. Rudy
ATTORNEY

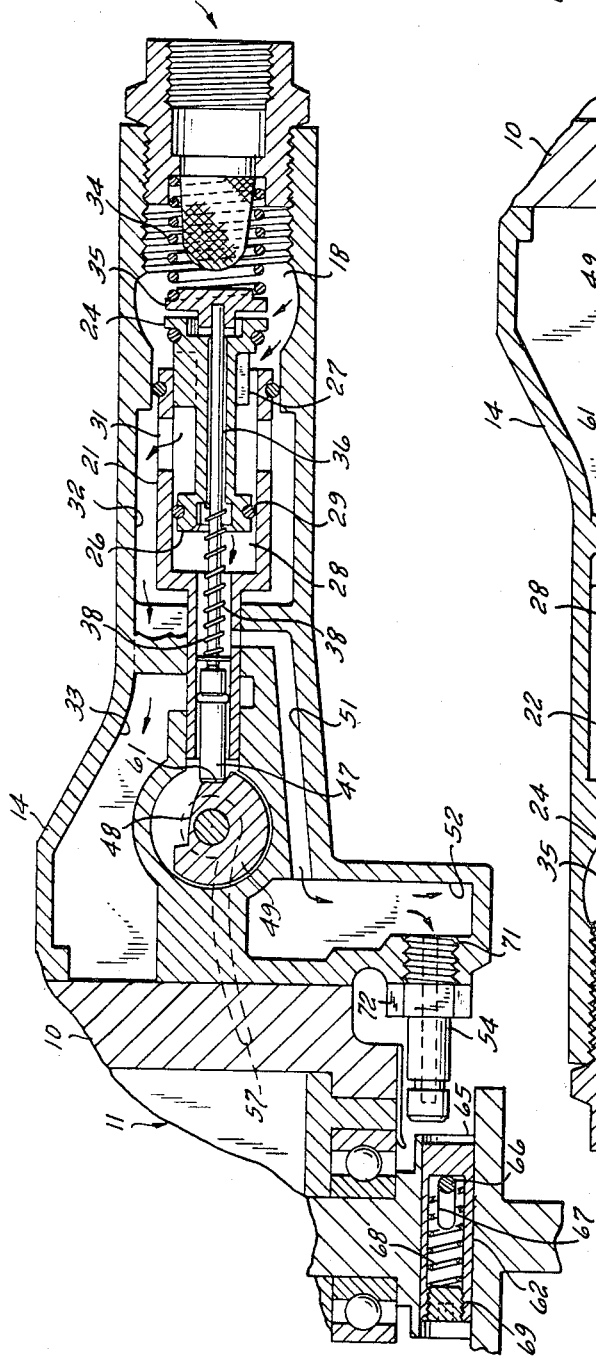

Nov. 12, 1968  K. A. McHENRY  3,410,030
SAFETY OVERSPEED CONTROL MECHANISM FOR ROTARY TOOLS
Filed Jan. 11, 1966  3 Sheets-Sheet 3
FIG.8
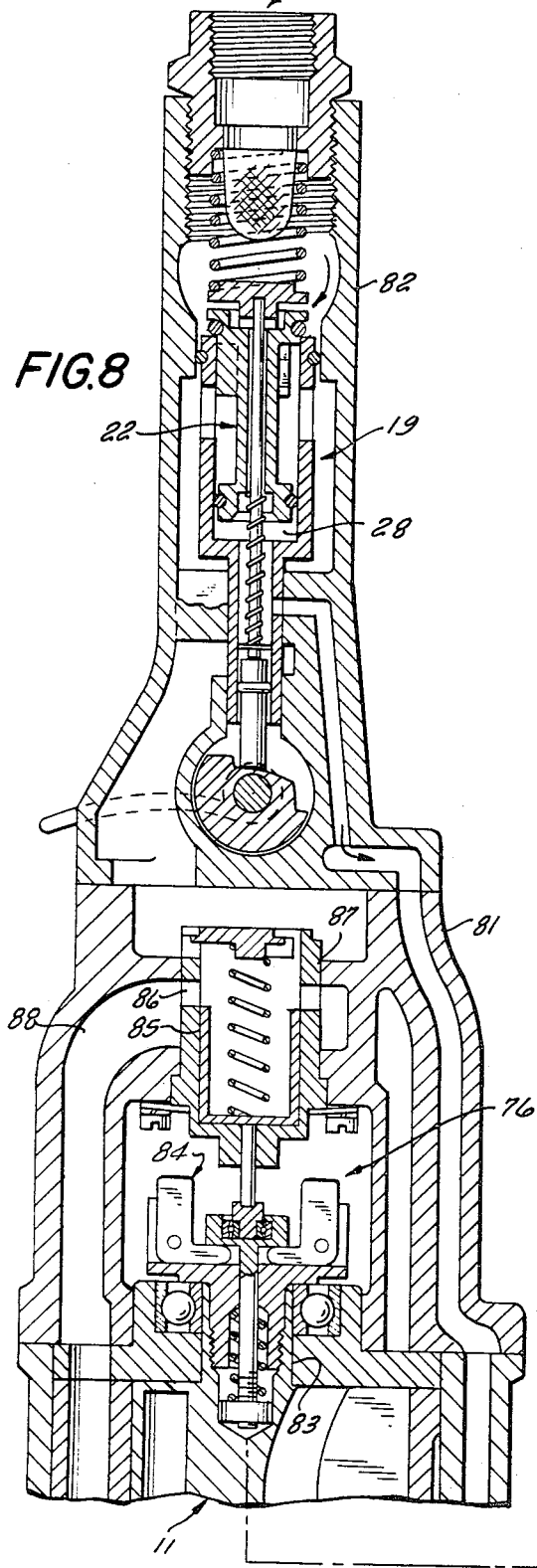
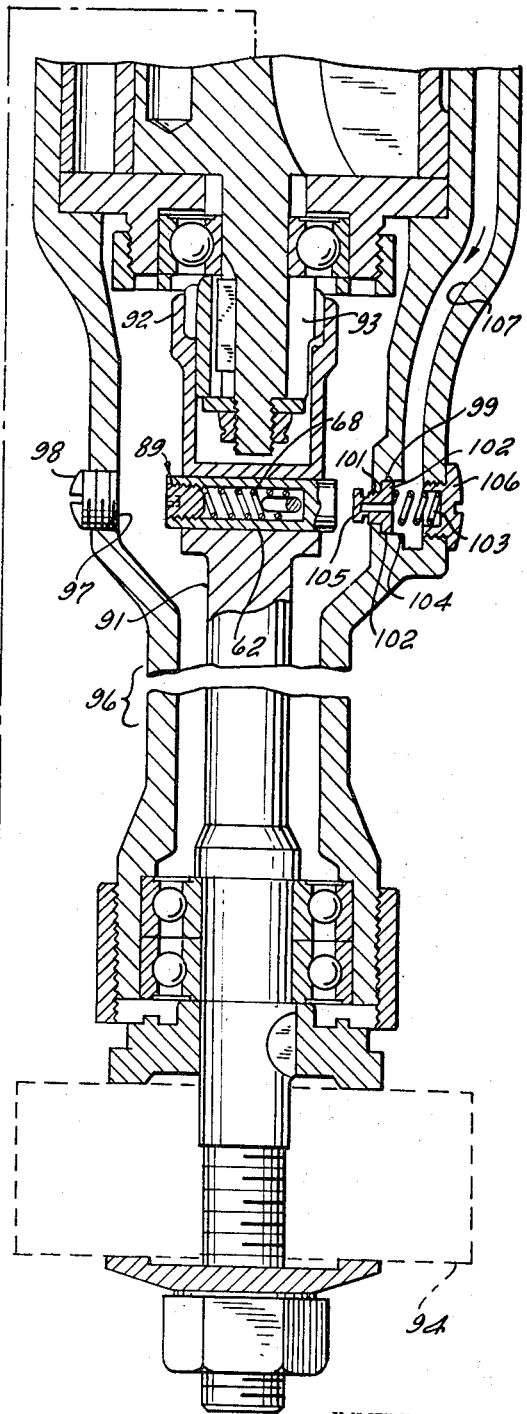
INVENTOR.
KENNETH A. McHENRY
BY
Stephen J. Rudy
ATTORNEY United States Patent Office 3,410,030
Patented Nov. 12, 1968

3,410,030
SAFETY OVERSPEED CONTROL MECHANISM
FOR ROTARY TOOLS
Kenneth A. McHenry, Clinton, N.Y., assignor to Chicago Pneumatic Tool Company, New York, N.Y., a corporation of New Jersey
Filed Jan. 11, 1966, Ser. No. 534,924
11 Claims. (Cl. 51—170)

ABSTRACT OF THE DISCLOSURE

Rotary tool fluid-control valve having a piston exposed on one side to inlet-chamber pressure and to counterbalancing pressure on the other side in a dead-end chamber which continuously communicates with the inlet-chamber. The dead-end chamber has a frangible plug extending outwardly adjacent a flyweight on the tool spindle. Heavy spring means which normally holds the valve closed is movable away from the valve piston by a manually cammable plunger carrying light spring means which engages the piston and opens the valve. Upon overspeed the flyweight (sliding outwardly under centrifugal force) breaks the plug, thus relieving the counterbalancing pressure and allowing inlet pressure to overcome the light spring pressure and close the valve independently of manual control.

This invention is directed to overspeed control mechanism for a rotary tool. It functions automatically in response to overspeeding of the tool to shut off flow of operating power to the tool, and simultaneously it disables the power control mechanism from being further operated until the operator removes the disability.

While the invention may be subject to wide application, it is especially suited for use as a component of a pneumatically powered rotary grinding tool.

Rotary grinding tools have a grinding wheel formed of frangible abrasive material, such as stone. These tools are used to grind down rough edges and other imperfections, such as are formed on metal castings and other work. During such operations, the grinding wheel is subject to temperature changes, strains, sudden torque variations, and centrifugal forces, the magnitude of all of which develop with the speed of the wheel. A governor is incorporated in some grinding tools to maintain the speed of the tool within prescribed limits. If for some reason, the governor should fail and the tool should then develop overspeed, it can be seen that damage may occur to the grinding wheel and other components of the tool with attendant hazardous conditions for the tool operator.

The general object of this invention is to provide a rotary grinding tool with safety mechanism for stopping operation of the tool by automatically shutting off flow of operating power to the tool in response to overspeeding of the tool, and simultaneously disabling the power control mechanism of the tool from being further effectively operated until the operator removes such disability.

FIG. 1 is a schematic illustration of a vertical type rotary grinding tool embodying the invention, and shows the tool in its normal unoperated condition;

FIG. 2 shows the tool in operating condition with its throttle valve open;

FIG. 3 shows the tool in a disabled non-operable condition following functioning of the overspeed control mechanism in response to overspeeding of the tool;

FIG. 4 is an enlarged section taken on the line 4—4 of FIG. 1;

FIG. 5 is an enlarged right end detail of the push-pin head;

FIG. 6 is an enlarged right end view of the valve head including the push-pin in section;

FIG. 7 is an enlarged detail of the valve and the associated push-pin; and

FIG. 8 discloses the invention as applied to a rotary long type grinding tool.

Reference is directed to the drawings, and now, particularly to FIGS. 1–7, wherein the invention is illustrated as embodied in a rotary grinding tool of the vertical type. The tool has a housing 10 of generally cylindrical form. Supported in the housing is a conventional air driven motor 11 of the slidable blade type. The motor has a vertically disposed output shaft or spindle 12, upon an external end of which is carried an abrading wheel or grinding stone 13. Extending in a generally radial direction from the side area of the housing is a pair of circumferentially spaced handles adapted to be manually held by the operator to maneuver the tool over a work surface. One of the handles (not shown) is conventionally arranged for gripping. The other handle, designated 14, is fitted at its end with an adapter 15 connectable by means of a hose line 16 to a source of pressure air. The adapter is fitted with an air filter screen 17 through which operating air from the hose line enters an inlet chamber 18. The handle houses air flow control mechanism (FIGS. 1 and 7), generally indicated at 19, controlling flow of operating air through the handle to the motor.

The air flow control mechanism includes a stationary valve bushing 21 in which a slide throttle valve 22 operates. An open end of the bushing defines an annular valve seat relative to which an annular head portion 24 (FIGS. 1, 6 and 7) of the valve is movable to open and closed condition. Extending axially from the valve head is a stem portion 25 terminating in a piston end 26. Radially extending from the valve stem adjacent to the valve head is a group of circumferentially spaced ribs 27 (FIGS. 7 and 4). The ribs and piston portion of the valve bear upon the internal wall of the bushing 21 as the valve moves, thereby avoiding undesirable side play of the valve relative to the bushing. A piston chamber 28 exists at all times in the bushing forwardly of the piston. In an open condition of the valve, as in FIG. 2, operating air flows from the inlet chamber 18 around the valve head 24 and between the ribs 27 of the valve into the bushing 21. A seal 29 seals against leakage of air around the piston. Air entering the bushing passes through radial ports 31 into a surrounding chamber 32 and connected passage means 33 leading through the housing 10 to the motor chamber to operate the motor 11. The valve is normally held in the closed condition of FIG. 1 by means of a closing spring 34 acting through a circular head 35 (FIGS. 1, 5 and 7) of a push-pin 36. The push-pin extends axially with a surrounding clearance 37 through the valve. A light valve opening spring 38 around a forwardly projecting end portion of the push-pin, expanded between a retainer 39 fixed to the push-pin and a recessed bottom of the piston 26, normally draws the push-pin forwardly relative to the valve so that a hub extension 41 of the push-pin head seats in a recessed end 42 of the valve head. In this seated relation of the push-pin head 35 with the valve head 24 a slight annular clearance 43 spaces the outer portion of the push-pin from the valve head and communicates around the hub 41 with a slot 44 in the latter having communication with the clearance 37 about the push-pin. The forward end of the push-pin extends with clearance into an elongated neck 46 of the valve bushing, wherein it abuts one end of a valve actuating slide pin 47. The latter has an air-tight seal at 59 with the surrounding wall of the neck of the bushing. A forward end of the actuating pin 47 normally lies in close proximity to a cam surface 48 of a throttle cam 49. The clearance 37 about the push-pin communicates with the piston chamber 28, which in turn communicates through a radial port 50 and a connected passage 51 with a dead-end or isolated chamber 52. This chamber is provided with an outlet 53 normally sealed by a frangible air-release hollow plug 54. Whether the throttle valve 22 be open or closed, as long as the main supply valve 55 in the supply line 16 is turned "on," operating air entering the inlet chamber 18 flows around the push-pin head 35 and the associated clearances 43, 44, 37 to fill the piston and dead-end chambers (28 and 52). During the time the dead-end chamber 52 is sealed by the plug 54 and filled with pressure air, the pressure air acting in the piston chamber 28 upon the piston end 26 of the valve counterbalances the pressure of air in the inlet chamber 18 acting on the head end 24 of the valve as in FIG. 1. This balanced condition of the valve facilitates opening of the valve by means of the light spring 38 when the force of the heavier return spring 34 is moved away from the valve upon rearward movement of the push-pin 36.

The throttle cam 49 is normally operable to effect opening and closing of the throttle valve. It is supported upon a lever 56 for rotation in the handle relative to the throttle valve actuating pin 47, and it is manually operable by means of an external finger portion 57 of the lever. In the normal unoperated condition of the tool, the throttle valve 22 is closed, and the throttle cam 49 has the rotated position shown in FIG. 1 wherein the low surface 48 of the cam lies in close proximity to an end of the actuating pin 47.

To operate the tool, the supply valve 55 in the supply line 16 is first turned "on." This causes operating air to enter the inlet chamber 18. The closed condition of the throttle valve 22 at this time blocks flow of operating air from the inlet chamber to the motor 11. A seal ring 58 about the valve bushing 21 prevents leakage of inlet air around the bushing to the passage 33 leading to the motor. The inlet air does, however, flow at all times through the clearances around the push-pin head 35 and the push-pin to fill the piston and dead-end chambers 28 and 52. The seal ring 59 about the actuating pin 47 seals the neck 46 of the bushing 21 against leakage of pressure air from the piston and dead-end chambers 28 and 52. The pressure of air filling the piston chamber 28 acts upon the piston end 26 of the throttle valve and normally counterbalances the pressure of inlet air acting upon the valve head 24. Next, the throttle cam 49 is manually rotated to its "on" position, as in FIG. 2. As it is turned, the cam surface 48 acts upon the actuating pin 47 to move the push-pin 36 and its head 35 axially against the resistance of the closing spring 34. As the load of the closing spring is progressively released in this action from the throttle valve 22, the latter is simultaneously moved to open condition under the force of the opening spring 38 to the position shown in FIG. 2. In the operated condition of the throttle cam 49, a high flat cam surface 61 thereof holds the push-pin locked in its moved position against the resistance of the closing spring, as in FIG. 2. Operating air then flows around the open valve and through the radial ports 31 of the bushing and connected passages 33 to operate the motor.

While the throttle valve is in its "on" condition, as in FIG. 2, the closing spring 34 is disabled by cam 49 from returning the push-pin 36 and moving the throttle valve to closed condition; and the throttle valve is held in its open condition by means of the light spring 38 due to the pneumatically balanced pressurized condition of the throttle valve. The air pressure acting on the valve 22 is relatively greater than the opposing force of the light spring 38. It is only because the air pressure in the piston chamber 28, acting on the piston end 26 of the valve, counterbalances that acting on valve 22, that the light spring 38 is able to hold the throttle valve open. It can be seen that if the counterbalancing air pressure on the piston end 26 of the valve is dumped or released to vent, the throttle valve will automatically move against the light spring 38 to closed condition under the pressure of inlet air acting on valve 22, even though the throttle cam 49 is in its "on" condition.

Air release or dumping means (FIGS. 1–3) is provided for automatically upsetting this balanced condition of the throttle valve during operation of the tool in the event the motor should develop overspeed by exceeding a predetermined maximum. This air release means includes a centrifugal flyweight 62 mounted in the output shaft 12 of the tool, which is cooperable with the frangible hollow plug 54 to rupture or break the latter and cause the pressure air acting on the piston end 26 of the throttle valve to be dumped through the plug. The flyweight is of cylindrical form. It is slidably received in a diametrical open-ended bore 63 of an enlarged cylindrical portion or collar 64 formed coaxially with the output shaft. The flyweight is positioned in the bore with its center of gravity slightly to one side of the vertical axis of the output shaft so that the centrifugal force developed by the rotating shaft will tend to slide the flyweight through a selected end 65 of the bore. A pin 66 anchored eccentrically in the output shaft extends at right angles through a longitudinal slot 67 of the flyweight. The left end of the slot (FIG. 1) is cooperable with the pin 66 to limit the extent to which the flyweight may be radially projected from the end 65 of the bore. A flyweight return spring 68 disposed interiorly of the flyweight between the pin 66 and a screw plug 69 of the flyweight yieldably holds the flyweight within the bore in a disabled normal condition in which the right end of the slot 67 (FIG. 1) limits upon the pin 66. During rotation of the output shaft 12, the tension of spring 68 tends to urge the flyweight inwardly of the shaft against the opposing centrifugal force of the rotating shaft. This tension may be regulated by axial adjustment of the screw plug 69. During operation of the tool at a speed within a predetermined normal range, the centrifugal force of the output shaft will be resisted by the tension of the flyweight spring 68. But, when resistance of the flyweight spring is overcome by an increase in centrifugal force as a consequence of overspeeding of the tool beyond its normal speed, the flyweight will be centrifugally thrown radially from the shaft to the extent permitted by the slot 67.

The frangible hollow plug 54 extends from the wall of the dead-end chamber 52 radially toward the output shaft 12 in the horizontal plane of the flyweight 62. Plug 54 is here shown as having a threaded end 71 screwed into the opening 53 of the dead-end chamber 52. Flats 72 are provided on the body of the plug, to which access may be had through an open area at the bottom of the tool for application of a wrench. The frangible plug terminates in a closure tip 73 which is spaced from the main body of the plug by means of an annular groove defining a neck 74. The latter provides a weak area in the plug. The plug is formed of frangible material so that a sharp blow against its tip will break it off at the neck area. The tip of the plug extends in close spaced relation to the periphery of the collar 64 of the output shaft, and lies in the path of rotation of the flyweight when the latter is centrifugally projected from the output shaft. Accordingly, when the flyweight is centrifugally thrown outwardly by the overspeeding shaft, it will, as it rotates, strike and break the tip from the plug, causing pressure air in the piston and dead-end chambers to be dumped through the passage 75 of the ruptured plug, as shown in FIG. 3. When this occurs, the throttle valve 22 closes, as earlier explained, under the pressure of air in the inlet chamber 18, and the motor 11 stops. The tool will thereafter remain stopped and disabled from operation, as in FIG. 3, until the ruptured plug 54 is removed and the outlet 53 of the dead-end chamber 52 is re-sealed with a new plug.

A speed control governor (not shown in FIG. 1), such as that shown at 76 in FIG. 8, is customarily incorporated in grinding tools. It functions to maintain the speed of the tool within a normal or prescribed range. The air release means 62, 54 (FIG. 1) is accordingly designed to serve as a safety measure, and to operate when the tool overspeeds, that is, exceeds the governed speed.

In FIG. 8, the invention is shown as applied to a rotary grinding tool of the long type. This tool has an elongated casing 81 of generally cylindrical form. It has a reduced end portion defining a handle 82 which the operator is adapted to grip in one hand during operation of the tool. The operator grips the central portion of the tool with his other hand to further support the tool. Here, the air flow control mechanism 19 is also housed in the handle. This tool is shown as including a centrifugal flyweight governor 76 drivingly mounted to one end of the shaft 83 of a pneumatic motor 11 of the blade type. The governor functions to hold the speed of the tool within a predetermined normal range. As the speed of the motor develops sufficiently to centrifugally actuate the governor flyweight means 84, an associated governor valve 85 is moved relative to radial ports 86 in a valve bushing 87 to throttle flow of operating air from the handle to a passage 88 leading to the motor chamber.

If for some reason the governor should fail to properly function causing the motor to overspeed, air release mechanism 89, which is here incorporated in the lower end of the casing, functions to upset the pneumatically balanced condition of the air control mechanism 19 in the manner earlier explained with respect to the tool shown in FIG. 1.

Here, the centrifugal flyweight 62 of the air release mechanism is arranged within the housing in an elongated spindle 91 which is coupled as at 92 to the driving end 93 of the motor shaft. The elongated spindle defines an extended output shaft, upon the external end of which a grinding wheel 94 is carried. A reduced elongated housing section 96 adjacent the grinding wheel and surrounding the extended output shaft enables the grinding wheel to be entered into, and to work in areas to which the vertical type of grinder shown in FIG. 1 is not accessible.

An opening 97, having a removable closure screw 98, is provided in the housing of the tool on the same level as the centrifugal flyweight 62. This opening permits insertion of a wrench into a socket end of the flyweight plug 89 for purposes of adjusting the plug to increase or decrease the tension of the flyweight spring 68.

A modified form of the frangible air release hollow plug is shown at 99, the body of which has a slide fit in a complementary opening 101 of the housing. A flanged portion 102 of the plug is held seated under the load of a spring 103 at the bottom of a counterbore 104 in the housing. A severable frangible tip 105 of the release plug extends into the interior of the housing in close spaced relation to the spindle 91 at about the same level as the centrifugal flyweight 62. It is so located that it will be in the path of rotation of the flyweight when the latter is centrifugally thrown outwardly by the overspeeding spindle, and will be broken off by the flyweight. The counterbore 104 opens opposite the release plug through the housing and is fitted with a removable cap screw 106. The latter provides an internal cup in which the spring 103 is seated. When it is necessary to replace the broken plug 99, cap 106 may be unscrewed from the housing and a new plug slidably inserted therethrough into position. The counterbore 104 connects by means of a passage 107 in the wall of the housing with the piston chamber 28 of the throttle valve 22. Passage 107 also communicates with the hollow interior of the release plug 99. Accordingly, when the tip 105 of the plug is broken off by the centrifugally thrown flyweight, the pressure air in the piston chamber 28 will be released or dumped into the housing of the tool from where it will escape through various vents, allowing the throttle valve 22 to close in the manner earlier explained with respect to the tool shown in FIG. 1.

What is claimed is:

1. In a rotary grinding tool including a grinding wheel, and a pneumatically powered motor having a spindle drivingly connected with the wheel, a pressure air chamber, an operating air inlet chamber communicable with the motor and having continuous communication with the pressure air chamber, a slide valve controlling flow of operating air from the inlet chamber to the motor, the valve having a rear head end exposed to pressure of air in the inlet chamber and having an opposite forward end exposed to pressure of air in the pressure chamber normally counterbalancing that in the inlet chamber, heavy spring means normally holding the valve closed, a plunger normally selectively cammable to move the heavy spring means away from the valve and carrying a light spring movable with the plunger against the valve to open the valve, the valve in open condition being responsive to the pressure of air in the inlet chamber to move to closed condition relative to the light spring when relieved of the counterbalancing pressure of air at its forward end, frangible air-release means normally blocking relief of air from the pressure air chamber, and centrifugally operable flyweight means carried by the spindle responsive to overspeeding of the motor to engage and break the air-release means so as to release air from the pressure chamber and as a consequence relieve the counterbalancing pressure of air from the forward end of the valve.

2. In a rotary grinding tool as in claim 1, wherein the flyweight is radially projectable from the spindle in response to a predetermined centrifugal force, and the frangible air-release means has a severable closure tip projecting into the path of rotation of the projected flyweight.

3. In a rotary grinding tool as in claim 2, wherein yieldable spring means tensions the flyweight inwardly of the spindle and predetermines the extent of centrifugal force required to be developed in the spindle to overcome the resistance of the yieldable spring means.

4. In a rotary grinding tool as in claim 2, wherein pin means in the spindle and slot means in the flyweight predetermine the extent of radial movement of the flyweight relative to the spindle.

5. In a rotary grinding tool as in claim 3, wherein means is provided for adjusting the tension of the yieldable spring means.

6. In a rotary grinding tool as in claim 4, wherein a cavity is provided internally of the flyweight, an adjustable screw closes one end of the cavity, and the yieldable spring means limits between the pin and the screw.

7. In a rotary grinding tool as in claim 1, wherein the flyweight is disposed in a diametrical bore of the spindle above the grinding wheel.

8. In a rotary grinding tool as in claim 2, wherein a speed control governor is arranged between the slide valve and the motor to maintain the speed of the motor within a predetermined range, and the maximum centrifugal force developing in the spindle when the motor is operating in said range is less than that required to project the flyweight relative to the spindle.

9. In a rotary grinding tool as in claim 1, wherein the tool is provided with a handle adapted to be manually held when operating the tool, and the slide valve is housed in the handle.

10. In a rotary grinding tool as in claim 9, wherein a main housing supports the handle, a bore is provided in the housing having lateral communication with the forward end of the slide valve, the bore opening at one end in opposed relation to the spindle on the plane of the flyweight and opening at the other end externally of the housing, the frangible air-release means is a hollow plug slidably seated in the bore having an open end communicating with the bore and having an external severable closure tip projecting on a level with the flyweight in opposed relation to the spindle, the opposite end of the bore allowing removal of the plug therethrough, and a removable cap screw closes said opposite end of the bore.

11. In a rotary tool including an output spindle, and a pneumatically powered motor drivingly connected to the spindle, valve means controlling flow of operating air to the motor, manually operable means for normally selectively opening and closing the valve means, the valve means having a pneumatically balanced condition when open and adapted to automatically close independently of the manually operable means upon the balanced condition becoming pneumatically unbalanced, and overspeed control means responsive to overspeeding of the motor for rendering the valve means pneumatically unbalanced.

References Cited

UNITED STATES PATENTS

| | | | |
|---|---|---|---|
| 2,099,280 | 11/1937 | Shaff | 173—12 |
| 2,149,645 | 3/1939 | Sittert | 91—76 |
| 2,326,396 | 8/1943 | Schaedler | 91—76 |
| 2,375,490 | 5/1945 | Overly | 91—76 |
| 2,897,832 | 8/1959 | Jimerson | 173—12 X |
| 3,257,913 | 6/1966 | Broom | 137—31 X |

ROBERT C. RIORDON, *Primary Examiner.*

D. G. KELLY, *Assistant Examiner.*